Nov. 23, 1937.                K. R. KENNISON                 2,100,219
                                OPEN NOZZLE
                          Filed Dec. 23, 1935            2 Sheets-Sheet 1
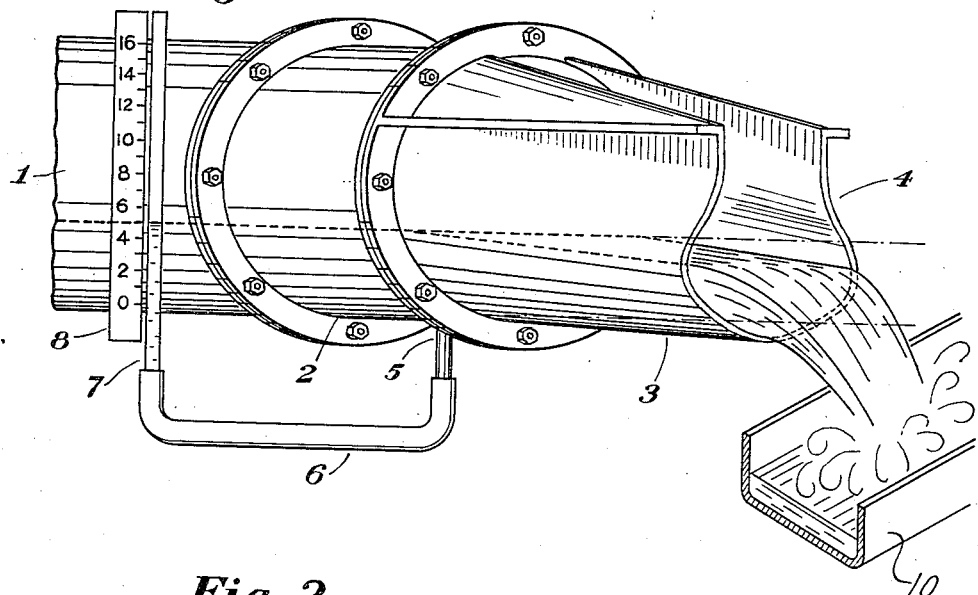
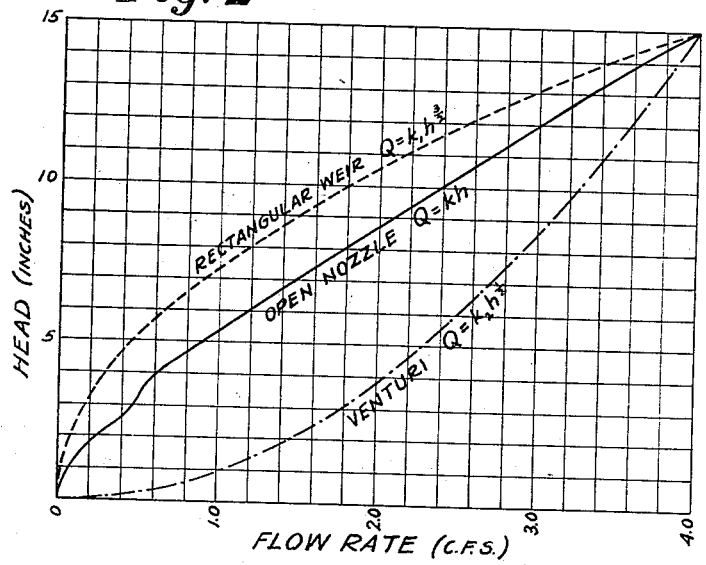
INVENTOR
*Karl R. Kennison*
BY
*Henry Dexter Peck*
ATTORNEY Nov. 23, 1937. K. R. KENNISON 2,100,219
OPEN NOZZLE
Filed Dec. 23, 1935 2 Sheets-Sheet 2
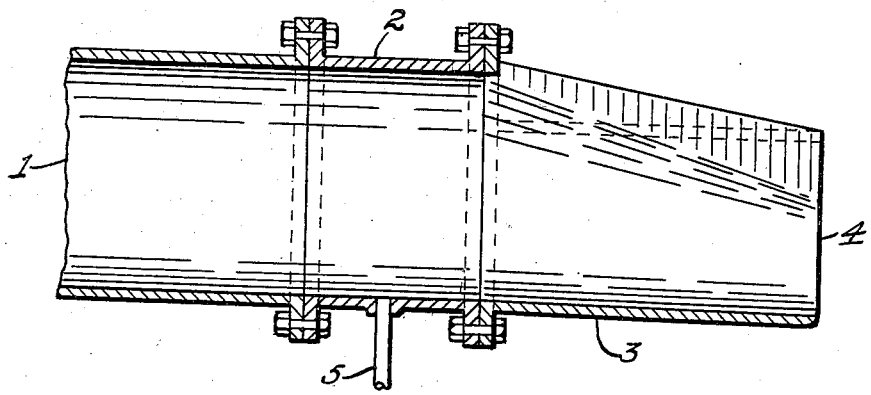
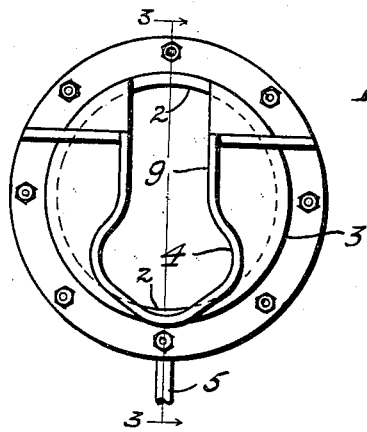
Karl R. Kennison
Inventor
By Harry Dexter Peck
Attorney Patented Nov. 23, 1937

2,100,219

UNITED STATES PATENT OFFICE 2,100,219

OPEN NOZZLE

Karl R. Kennison, Newton, Mass., assignor to Builders Iron Foundry, Providence, R. I., a corporation of Rhode Island Application December 23, 1935, Serial No. 55,824

8 Claims. (Cl. 73—215)

This invention relates to improvements in head producers of the weir type for liquid flows in fluid conduits in which dirt and trash must be passed with a minimum likelihood of clogging and with but little loss of head. For this purpose I have uniquely modified a nozzle to bear the same relation to the usual nozzle for a closed conduit that an open Venturi flume does to the usual Venturi tube for closed conduits.

An object of my invention is to provide an improved weir that allows no opportunity for the settling of solids and which would consequently not require the frequent cleaning needed with an ordinary weir to ensure reliably accurate metering.

Still a further object of my invention is to so improve such a weir that the head on the weir has substantially a lineal relation to the flow rate.

Still another object is to provide a construction which has a minimum uncertainty of head due to wave action and possible alternative modes of flow: "shooting" and "drowned" flow.

A further object is to provide a compact and reliable metering head producer, particularly suitable for the measurement of sewage, which has unique accessibility for cleaning.

With these and other objects in view, which will be made apparent, I now describe the preferred embodiment of my invention illustrated in the drawings.

In the drawings:

Fig. 1 is a somewhat diagrammatic perspective representation of my open-nozzle in connection with a piezometer.

Fig. 2 is a graph showing the rating curve characteristic of a 16-inch open nozzle embodying my invention.

Figure 3 is a longitudinal vertical section, taken as on line 3—3 of Figure 4, of the nozzle and pipe sections shown in Figure 1; and Figure 4 is an end view of the same looking from the right of Figure 3.

The flow of dirty liquids, such as sewage, is desirably metered by a differential producer having a smooth and gradual restriction to the flow through circular conduit 1. I show attached to the end of this conduit 1 a flow nozzle of the open type, hereinafter open-nozzle, consisting of a cylindrical attaching portion 2 having the same diameter as that of conduit 1, and a restricted portion 3, the restricted portion being open at the top and having an outlet end 4. The level of the liquid is transmitted from the tap 5 in the invert of portion 2 by connecting pressure pipe 6 to large glass tube 7, having calibrated scale 8 located adjacent thereto. The level of the liquid in glass tube 7 indicates on its scale 8, the then rate of flow.

In Fig. 2, I illustrate the rating curve for my open-nozzle, as shown in Fig. 1, by a solid line. By a dotted line, I show the relation between the head and flow rate for a rectangular weir. On this graph I also show a dot-dash line for the relation between the head and flow rate for the corresponding differential producer: Venturi tube, nozzle or orifice, for use in closed conduits.

From Fig. 2, it will be observed that I have provided an improved weir: an open-nozzle of such unique form as to give substantial freedom from the non-lineal relation between head and flow rate characteristic of the usual weirs, Venturi and Parshal flumes for open conduits and of Venturi tubes, nozzles and orifices in closed conduits.

I am aware that limited use is elsewhere made of a flat-face weir having an approximately lineal characteristic. However, this weir is essentially unsuited for the measurement of dirty liquids since it has its widest opening at the minimum rates and so requires extremely precise levelling; the effective weir opening being greatly reduced at the higher rates. This weir requires a large stilling basin on its upstream side that invites deposition of any heavy matter carried by the stream and, due to the change of direction of the liquid at the face of the weir, there exists an objectionable tendency for solids to accumulate on the face of such a weir and thus soon adversely affect its accuracy.

Another type of large meter having only an approximately lineal relation between head and flow rate, is the Herschel hollow-crest weir described in Herschel's 1920 A. S. M. E. Paper No. 1744. This weir requires that two pressures be taken, one at a point of high velocity, and their difference used as the head. Further, Herschel's weir involves a settling basin upstream that is liable to fill with sludge or detritus when metering sewage. Still further, the full width of the crest is used by Herschel's weir at the lowest rates so that, even when precisely leveled, its lineal relation is in no way dependable there due to surface tension effects. My invention, as illustrated and as described below, is superior on each of the above points since it uses but a single pressure taken at a point of low velocity, has no point where matter is liable to deposit and the effective crest width narrows at low rates to give reliable and readably high heads there.

In my unique form of weir, I have provided a gradual contraction from the normal section of conduit 1 to a narrow funnel-shaped trough at outlet 4 of restricted nozzle portion 3. The cross section of the stream in the trough gradually increases in width as the level rises until a point is reached where the area of the section of the stream at outlet 4 forms an appreciable portion of that of the conduit, so that the effects of the velocity of approach in the conduit are felt. The width of the trough at the outlet is then narrowed down, to a vertical slot 9, with increasing elevation to compensate for this approach-velocity effect.

The length of this nozzle portion 3 may be about one and one-half the diameter of conduit 1. At the outlet end 4, the vertical distance from the bottom of the outlet to the level of maximum width may be approximately one-quarter the diameter of conduit 1. The maximum width of the outlet 4 may be approximately three-quarters of the diameter of conduit 1, but this is not to be deemed a limiting relation. In practice I have found that with a 10-inch conduit, the maximum width of the outlet may be as much as four-fifths of the diameter of the conduit, while with a 16-inch conduit, the maximum width of the outlet may be only five-eighths of the diameter of the conduit. The vertical distances from the level of maximum width to the bottom of slot 9 and to the top of the outlet are immaterial and the width of the vertical slot 9 may be approximately one-third the diameter of the conduit 1.

The bottom portion of the outlet is preferably the arc of a circle and the curves at the level of maximum width may also be arcs of circles with tangent lines connecting them to the arc at the bottom. The transition curves between the curves at maximum width and the slot 9 may also be arcs of circles, all as shown in Figure 4.

The typical rating curve in Fig. 2 is for an open-nozzle having the shape of the outlet 4 as shown in Figure 4 and of size to be used in connection with a 16″, approximate diameter, circular conduit having a slope of 0.0018. The rating curve shows a substantially lineal relation throughout the working part of the range from 0.6 to 4.0 cubic feet per second. Even at unimportant lower rates, there is adequate head for measurement of an accuracy better than that consistent with the importance of such flow. While the nozzle shape could be altered to give a more nearly lineal relation at these extremely low rates, this is undesirable since the head would fall off to such a low value that surface tension effects would introduce uncertainties at rates within the metering range. It is better in practice to retain the present form that brings the head, in the above example, up to 1″ at as low a value as 0.08 cubic feet per second, which is 1/50th of the maximum rate of 4.0 cubic feet per second. In other words it is preferable to so shape the outlet end of the open-nozzle that the low rates of flow are proportional to a higher-than-the-first power of the head at such low rates, as for example any power between one-half and three-halves of the head.

My above-described 16″ open-nozzle will pass a sphere of 8.8″ in diameter, whereas a Venturi tube having the same maximum capacity at the usual maximum differential would pass a ball of only 4.5″ diameter through its throat. Further, since my open-nozzle requires the unique contraction of the end section 4 only in its lower portion, it is conveniently provided with a wide slot in the top portion through which it can be readily swept clean at any time. As will be noted, I have provided two projecting horizontal fins, one on each side of this nozzle, to support accurately prepared surfaces for setting the nozzle at the predetermined grade and slope, and for checking the continued accuracy of such setting. Further, it is seen that I preferably provide a drop from the upper conduit at outlet 4 to a lower conduit 10 so as to ensure that the open-nozzle will have "free" instead of "drowned" flow. By keeping the slope of the conduit upstream of my open-nozzle sufficiently flat, I reduce the maximum velocity possible as to eliminate any risk of "shooting" flow, which alternative mode would pass liquid at any given volume-rate at a high velocity through a reduced area, as is well known. While I have illustrated and described the preferred embodiment of my invention, it is to be distinctly understood that I am not to be limited thereby, except as to the claims appended hereinafter in view of the prior art. Furthermore, I may actuate a register, indicator and/or recorder from a float in a still well instead of directly observing the level of the liquid in glass 7. I may utilize other profiles and forms of open-nozzles, particularly as to slope for minimizing the effects and likelihood of "shooting" flow without departing from the spirit of the invention.

I claim:

1. In a meter for a liquid flowing from a conduit, an open-nozzle attachable to said conduit and having a trough-like portion shaped at its entrance to align with the said conduit and thence narrows to its outlet, the lower edge of said outlet being no higher than the bottom line of said conduit and upper portion of said outlet being a top-open slot with vertical walls, the said trough-like portion being arranged to progressively alter the cross sectional area of the stream of said liquid relative to that at a given point in said conduit with increase in the depth of said liquid therein.

2. A head producer for a liquid flowing from a circular conduit, comprising an open-nozzle attachable to said conduit for restricting the cross sectional area of the stream of liquid and having an outlet trough portion that is narrow at the bottom and which progressively widens and then narrows to a vertical-walled section at the top.

3. A head producer for a liquid flowing from a circular conduit, comprising, means attachable to said conduit for restricting the sectional area of the stream of liquid and having an outlet trough portion that is narrow at the bottom and which progressively widens and narrows to a substantially vertical-walled slot at the top whereby the said portion maintains a direct proportion between the quantity of flow and the head of the liquid.

4. In an open-nozzle for a liquid flowing therethrough, an outlet portion that is trough-shaped at the bottom, has a relatively narrow vertical-walled section at the top, and is wider in between.

5. Nozzle means for producing a metering head for a liquid flowing from an upper to a lower conduit, comprising, means for attaching said nozzle means to the down-stream end of said upper conduit, a pressure tap at the invert of said attaching means adjacent to said upper conduit, and an outlet means having a trough portion that is narrow at the bottom and which progressively widens and narrows to a substantially vertical-walled slot at the top, being formed to restrict the section of the outflowing stream of liquid relative to that at said pressure tap to maintain a substantially lineal relation between the flow rate of said liquid and the metering head at said pressure tap.

6. A restricting means at the downstream end of a conduit for creating a head at a point therein corresponding with the rate of a liquid flowing therethrough, an outlet portion of said restricting means being trough-shaped at the bottom, narrow at the top and wider in between and shaped to maintain said flow rate substantially directly proportional to the head at said point at medium to high rates, and proportional to a higher-than-the-first power of the head at lower rates.

7. A restricting means at the downstream end of a conduit for creating a head at a point therein corresponding with the rate of a liquid flowing therethrough, said restricting means being generally of trough-shape which is narrow at the bottom and successively widens and narrows to a vertical-walled portion toward the top, thereby to maintain a predetermined relation between said flow rate and any power between one-half and three-halves of the head at said point.

8. An open-nozzle for liquid discharge from a circular conduit, comprising a trough portion shaped to alter progressively the cross-section of the flowing liquid and having an outlet that is narrow at the bottom and successively widens and then narrows to a vertical wall section; the said trough portion being constructed and arranged to maintain a direct proportion between the quantity of flow and the head of the liquid being discharged.

KARL R. KENNISON.